A. KNUTSON.
SEED CORN TESTER.
APPLICATION FILED OCT. 28, 1918.
1,293,803.
Patented Feb. 11, 1919.
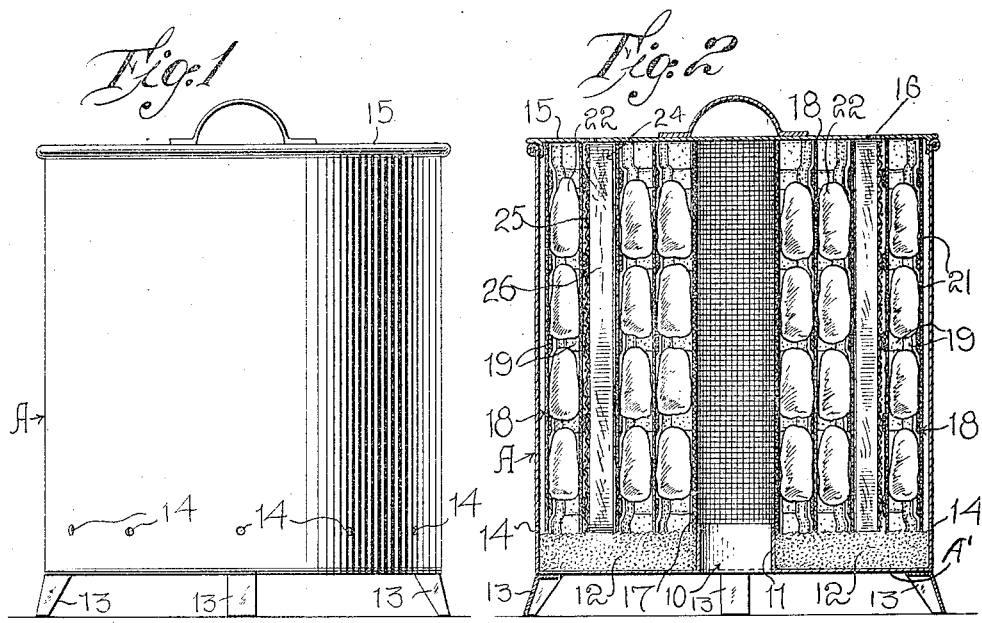
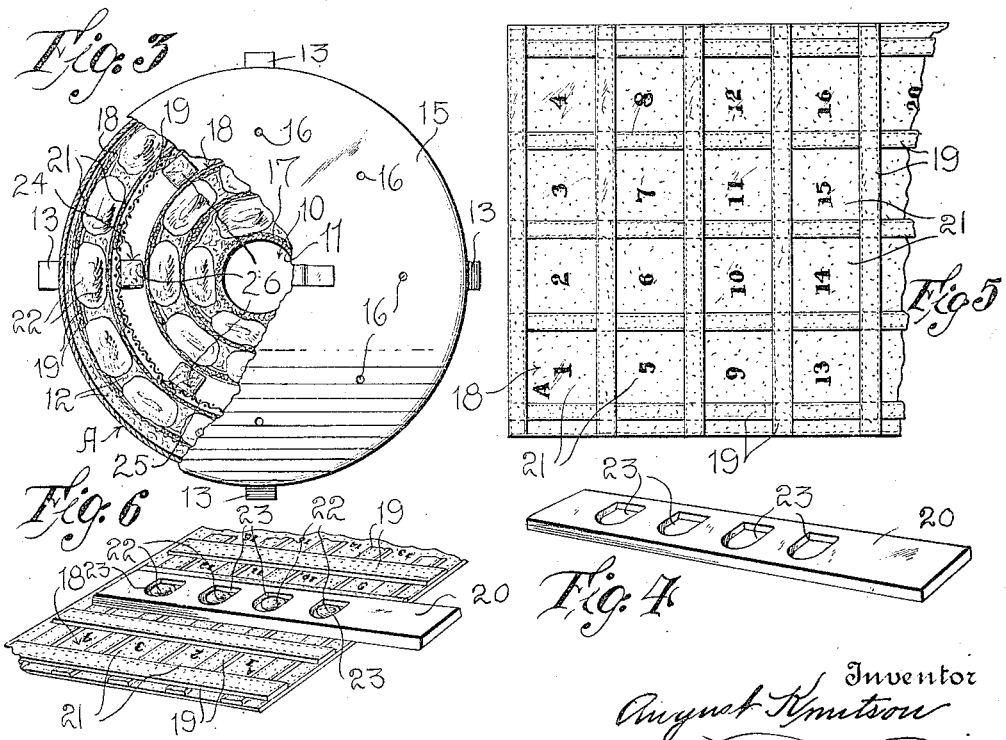
Inventor
August Knutson
Attorneys

UNITED STATES PATENT OFFICE.

AUGUST KNUTSON, OF MAPLETON, MINNESOTA.

SEED-CORN TESTER.

1,293,803.

Specification of Letters Patent.

Patented Feb. 11, 1919.

Application filed October 28, 1918. Serial No. 259,994.

*To all whom it may concern:*

Be it known that I, AUGUST KNUTSON, a citizen of the United States, residing at Mapleton, in the county of Blue Earth, State of Minnesota, have invented certain new and useful Improvements in Seed-Corn Testers; and I do hereby declare the following to be a full, clear, and exact description of the invention, such as will enable others skilled in the art to which it appertains to make and use the same.

This invention relates to testing devices and more particularly to devices for testing the germinating qualities of seed corn, and has for its object to provide a testing device constructed to receive and hold grains of corn in such a way as to permit and also promote the germination thereof.

Another object is to provide a structure including a corn holding element so made that the grains of corn may be easily placed therein, and which will be provided with indicia so that a record of various grades of corn and the quality thereof may be kept.

Another object is to provide such a structure, including means for supplying moisture to corn contained therein, and so made that air may circulate therethrough.

In the drawings:

Figure 1 is an elevation of the present invention. Fig. 2 is a vertical section.

Fig. 3 is a top plan, with the cover broken away to disclose the interior.

Fig. 4 is a perspective view of the grain placing rack. Fig. 5 is a plan illustrating the structure of the grain carrier.

Fig. 6 is a perspective view illustrating the use of the rack.

Referring now to the drawings, the present invention includes a cylindrical container A, having a flat bottom and an open top, the bottom, indicated at A', having a central circular opening 10, surrounded by an upwardly extending flange 11, and upon the bottom A' there is disposed a quantity of absorbent material 12—preferably sawdust—which is prevented from passing through the opening 10 by the flange 11.

The container A is supported upon legs 13, so as to admit air through the opening 10, and free circulation of air is permitted by vents 14 formed through the wall of the container, as shown. Air circulation is also promoted by openings 16, formed through a cover 15 removably fitted to the top of the container.

Removably engaged with the flange 11, there is a reticulated cylinder 17, which extends vertically within the container, this cylinder being preferably formed of wire screen, and this cylinder serves as a core for a grain carrier to be now described.

The grain carrier consists of a strip of fabric 18, having spaced parallel straps 19 secured upon one face thereof, both longitudinally and transversely, so as to form a plurality of separate shallow recesses 21 for the reception of grains of corn 22, which are to be tested. As indicated in Fig. 5, these recesses are provided with indicia, so that a record of the grains placed in any series of recesses may be kept.

For conveniently placing the grains in the recesses, there is provided a rack 20, having a plurality of openings 23 therein. As illustrated in the drawings, these openings are of a size to admit of the passage of but one grain of corn therethrough, though it will be understood that the openings may be made of a size to accommodate any desired number of grains, according to the capacity of the recesses 21. The rack is employed in the manner shown in Fig. 6, and through its use, it is assured that not more than one grain 22 will be placed in each recess.

In use, the carrier is laid out flat, and grains of corn are disposed in its recesses, the carrier being rolled about the cylinder 17, which thus acts as a core therefor. The rolled carrier and the cylinder are then placed within the container, with the cylinder fitted upon the flange 11 above the sawdust, as illustrated.

Before the carrier and cylinder are so placed, however, the sawdust 12 is moistened, and thus moisture will be carried to the fabric 18 through capillary attraction, to give moisture to the grains of corn 22, thus promoting their germination.

In the drawings, there are illustrated two of the fabric strips 18 in use, and interposed between these, there is a ventilating spacer 24 which consists of a sheet of wire screen 25 having slats 26 attached thereto, the slats serving to hold the outer strip of fabric spaced from the inner strip, as shown.

What is claimed is:

1. A testing apparatus comprising a container having an opening in its bottom, an upwardly extending flange carried by the bottom of the container and surrounding the opening, absorbent material disposed upon the bottom, a reticulated core removably engaged with the flange and a grain carrier consisting of a strip of fabric provided with grain receiving recesses said carrier being coiled about the core and contacting the absorbent material.

2. A testing apparatus for seed grain comprising a container provided with ventilating openings, an absorbent within the container, a reticulated core within the container disposed to receive air therewithin from one of the ventilating openings and a grain carrier coiled about the core, said grain carrier consisting of a strip of fabric having grain receiving recesses therein, said carrier contacting the absorbent.

3. A testing apparatus comprising a container having a ventilating opening therein, a reticulated core removably disposed within the container in position to receive air from the ventilating opening through its reticulations, absorbent material within the container, a grain carrier coiled about the core, and contacting the absorbent material, said grain carrier consisting of a strip of fabric having grain receiving recesses therein, a spacer surrounding the carrier, said spacer consisting of a sheet of screen fabric and slats secured to the fabric, and a second grain carrier surrounding the spacer.

In testimony whereof, I affix my signature, in the presence of two witnesses.

AUGUST KNUTSON.

Witnesses:
BENJ. F. GREGOR,
E. F. BOUHERT.

Copies of this patent may be obtained for five cents each, by addressing the "Commissioner of Patents, Washington, D. C."